Figure 1:
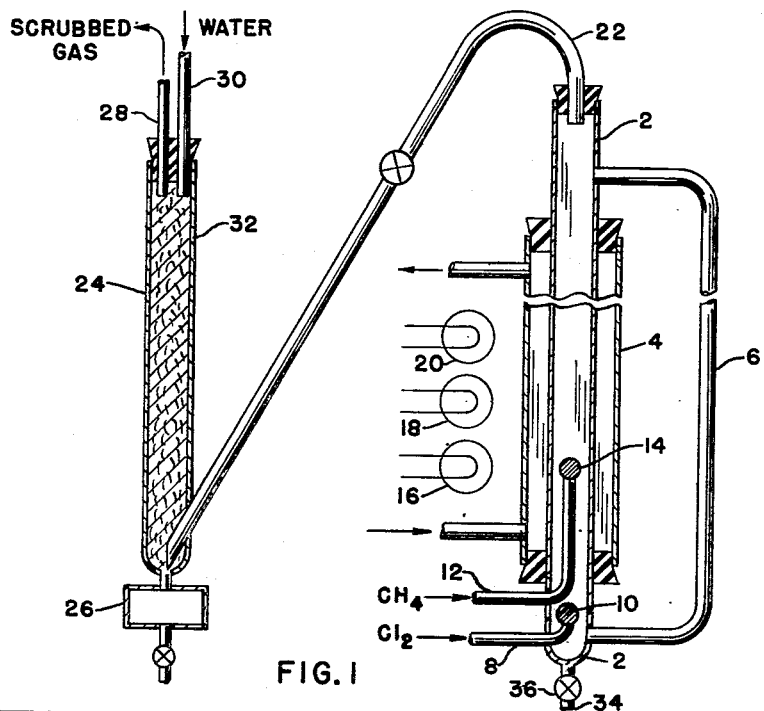

UNITED STATES PATENT OFFICE 2,688,592

PHOTOCHEMICAL PROCESS FOR PREPARING CARBON TETRACHLORIDE

Maxwell J. Skeeters, Painesville, Ohio, and Robert S. Cooper, Park Forest, Ill., assignors to Diamond Alkali Company, Cleveland, Ohio, a corporation of Delaware Application October 21, 1950, Serial No. 191,400

3 Claims. (Cl. 204—163)

This invention relates to a method for the chlorination of methane and more particularly relates to a method for the exhaustive, liquid-phase, photochemical chlorination of methane to carbon tetrachloride in a liquid solvent at comparatively low temperatures.

With respect to chlorination, among the aliphatic hydrocarbons, methane is unique in that unlike its higher homologues, all of the hydrogen atoms of methane are primary and all of the valences of the carbon atom are shared with hydrogen. In part, because of this peculiar molecular structure, methods of chlorination which are successful with higher aliphatic hydrocarbons have not produced the desired results when applied to methane. For example, it is known that the substitution of one chlorine atom for a hydrogen atom of an aliphatic hydrocarbon facilitates the further substitution of another chlorine atom for hydrogen on the same carbon atom. However, the ease of substitution of chlorine for hydrogen decreases in the order, tertiary, secondary, primary, i. e., the substitution of chlorine for a primary hydrogen of a hydrocarbon is normally more difficult than either secondary or tertiary hydrogens, and more energy is required to effect substitution in the primary position.

Also, there is basis in fact for the theory that chlorine substitution in aliphatic hydrocarbons is a chain reaction in which chlorine molecules are initially transformed into chlorine atoms by dissociation, due to the absorption of energy by the molecules. These atoms then induce removal of hydrogen atoms from a hydrocarbon or chlorinated hydrocarbon molecule, with attendant formation of a hydrocarbon radical or chlorinated hydrocarbon radical, which radical may in turn induce transformation of further chlorine molecules to atoms and the subsequent substitution of a chlorine atom in the hydrocarbon or chlorinated hydrocarbon radical with the attendant evolution of energy. A chlorine atom remains from this reaction and may continue the cycle if it does not collide with another chlorine atom. The hydrocarbon or chlorinated hydrocarbon radicals may also be neutralized by collision with molecules of some other substance, such as the containing walls of the reaction vessel, or with the molecules of the reaction medium itself. The necessary activation energy required to transform a chlorine molecule to a chlorine atom may be supplied initially either thermally, by carrying out the reaction at temperatures above 300° C., or by irradiation of the chlorine in gas phase, or in solution in a suitable solvent with actinic light preferably having a wave length within the visible spectrum.

Uncontrolled, the chain reaction may proceed at such a rate that carbon and HCl are the end products, in accordance with the following:

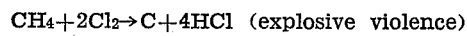
$CH_4 + 2Cl_2 \rightarrow C + 4HCl$ (explosive violence)

or, it may be so controlled that it proceeds stepwise with the net result:

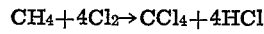
$CH_4 + 4Cl_2 \rightarrow CCl_4 + 4HCl$

Thus, the photochemical chlorination of methane in a mixture of methane and chlorine in the necessary proportions to produce carbon tetrachloride may become self-sustaining, extremely violent, and is ordinarily difficult to control as long as the relative proportions of the reactants in the mixture remain relatively near the theoretical requirements. Unless further quantities of reactants are applied to the reaction zone, as the reaction proceeds, the relative concentration of reactants decreases and the chance of collision of an activated chlorine atom with a hydrocarbon radical or chlorinated hydrocarbon radical, prior to collision with a neutralizing chlorine atom or other substance in the reaction zone, becomes relatively slight and reaction efficiency rapidly decreases.

The problem in the exhaustive photocatalyzed chlorination of methane in liquid phase, i. e., chlorination in a body of a liquid solvent such as carbon tetrachloride, which is a solvent for both chlorine and methane and which is inert to both the reactants and reaction products, presents special problems arising out of the violence of the reaction, not encountered in the chlorination of higher aliphatic hydrocarbons. One important problem in this connection has been moderation of the reaction rate, i. e., in accordance with the chain reaction theory given above, neutralizing a portion of the hydrocarbon or chlorinated hydrocarbon radicals by whatever means is available as the reaction proceeds, such as by controlling the relative concentration of activated reactants, so that the substitution reaction proceeds in a relatively gradual and stepwise manner. By thus moderating the reaction rate, the unreacted reactants and the liquid medium in which they are dissolved are not discharged from the reaction zone by the violence of the reaction before such reaction has proceeded to a practical maximum degree.

One method proposed by the prior art for moderating the chlorination reaction in the chlorination of methane comprises mixing gaseous chlorine and methane in the dark and passing the gaseous mixture into a body of carbon tetrachloride immediately adjacent a high intensity light source in order that the chlorine and methane gas mixture may react in the carbon tetrachloride, whereby the energy evolved is absorbed by the solvent during the chlorination reaction. In such a system a temperature equilibrium is generally established between about 60° C. and the boiling point of the solvent, chlorination efficiency is low, and large amounts of by-products and reactants must be recovered and recycled to the reaction zone in order ultimately to obtain exhaustive chlorination of the methane.

Other methods described in the prior art for the moderation of the chlorination of methane include premixing chlorine and methane in the desired stoichiometrical proportions, passing the gaseous mixture into a gas phase reaction zone which is irradiated in order to activate the chlorine molecules, and the boundary walls of which zone are in such close proximity as to tend to neutralize a fairly large proportion of the radicals and chlorine atoms in order to prevent the rapid propagation of the chain reaction and the probable explosion therein. From this reaction zone, in which a partial chlorination of the methane takes place, the gaseous reactants and reaction products are introduced into a body of irradiated carbon tetrachloride, wherein much of the energy evolved during the subsequent final chlorination steps is absorbed.

Whatever may be the merits of these prior art methods in their attempts to moderate the chlorination reaction as it is applied to the chlorination of methane, it has been found that where resort is had to the moderation technique, another problem arises immediately in that the reaction must proceed and the chain reaction must be sustained to such an extent that economical yields of the desired end product, carbon tetrachloride, are obtained without the production of large amounts of by-product partially chlorinated methane derivatives. In this connection, the prior art methods for moderating the exhaustive chlorination of methane in a suitable inert solvent have encountered relatively large amounts of partially chlorinated methane derivatives which have required the recycling of these materials to the reaction zone in order to obtain economically satisfactory yields of carbon tetrachloride without the loss of the valuable reactant chlorine. In addition, the large amounts of the material to be recycled require additional equipment in the process, all the way from handling reactants and reaction products to the storage thereof, and detract from the economy of these processes.

It has now been found that methane may be rapidly, exhaustively, photochemically chlorinated in a body of liquid solvent, such as carbon tetrachloride, if two important factors are coincident. The two factors are first, that the chlorine must be dissolved substantially completely in the body of solvent before the gaseous methane is introduced thereinto, and second, that the average temperature of the solution of chlorine and reaction products in the solvent in the reaction zone be maintained substantially within the range of 0° C. to 30° C.; a further factor ancillary to these factors is that the region of the introduction of methane into the body of the chlorine solution in the solvent be a region of maximum irradiation intensity. Moreover, by carrying out the chlorination of methane in a liquid solvent, such as carbon tetrachloride, in accordance with the above principles, an inverse temperature-efficiency relationship is obtained, i. e., the efficiency of the chlorination reaction increases as the average temperature of the chlorination medium in the reaction zone decreases within the above-noted range. By "average temperature" is meant the average overall temperature of the reaction medium in the reaction zone as determined by ordinary thermometric means. It is, of course, obvious that temperatures of small portions of the reaction medium, i. e., of the order of molecular dimensions particularly in the region of the greatest reaction intensity, may exceed the temperatures given herein as the reaction temperature, but it is intended that the average temperature of the mass of the reaction medium in the reaction zone shall be taken as the reaction temperature. This temperature may conveniently be determined by ordinary thermometric means in contact with the effluence of the reaction medium from the reaction zone.

The method of the present invention embodying the above factors includes the steps of providing a body of liquid carbon tetrachloride, dissolving elemental chlorine in said liquid, subsequently introducing gaseous methane into the chlorine solution, irradiating said solution during the introduction of methane thereinto, and maintaining the average temperature of said solution substantially within the range of 0° C. to 30° C.

The invention herein may be more fully understood by frequent reference to the drawings attached hereto and made a part hereof as the description of the method proceeds from the more general to the more specific aspects thereof, and finally to the specific examples.

Figure 2:
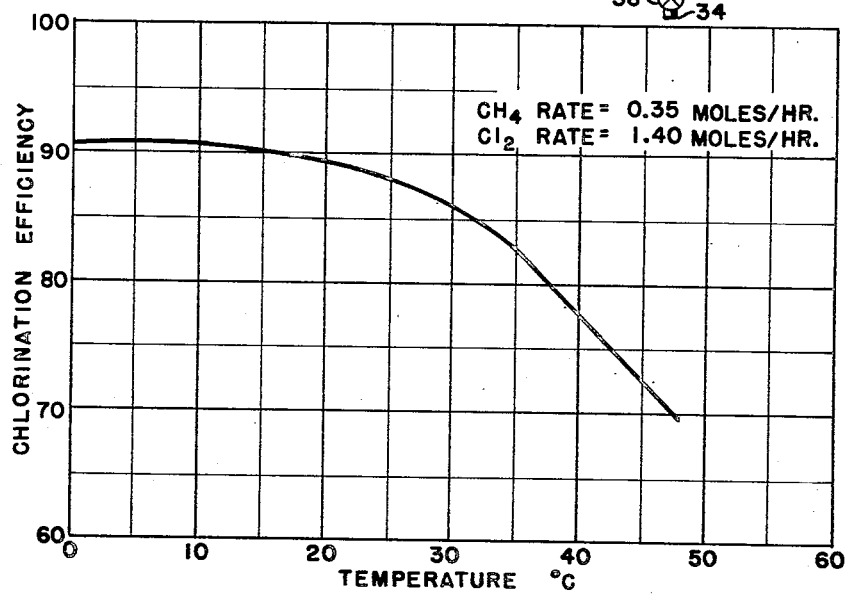

In the drawings:

Fig. 1 is a diagrammatic representation of a preferred type of apparatus for carrying out the method of the present invention; and, Fig. 2 is a graph of the curve of the inverse temperature-efficiency relationship obtained by the method of the present invention.

Referring now to Fig. 1, an apparatus for carrying out the method of the present invention is shown, in which a reactor having a transparent vertical tubular portion 2, in which the chlorination reaction takes place and which is designated as the reaction zone for the purposes of this description, is surrounded over a portion of its length by jacket 4, which may contain a suitable coolant to provide for the necessary temperature control during the chlorination reaction. Conduit 6 extends from the top of the reaction zone to the bottom thereof, entering tubular portion 2 just below the diffusion means 10 at the terminus of chlorine inlet 8. Methane inlet 12, having diffusion means 14 as its terminus, extends upwardly into the reaction zone to a point well above the terminus of the chlorine inlet 8 in order to insure substantially complete solution of chlorine prior to contact with methane, and preferably discharges at a point opposite the initial region of highest irradiation intensity, such as a point opposite light source 16. Additional light sources 18 and 20 may be arranged along the reaction zone in any suitable manner.

The tubular portion 2 of the reactor is fitted with an effluent gas outlet 22 in fluid connection with scrubber tower 24, the liquid effluent of which tower empties into storage tank 26, and gaseous effluent outlet 28 which is vented to the atmosphere. Line 30 admits water or other suitable absorbing fluid to the tower 24. The absorbing fluid may be sprayed into tower 24 or allowed to trickle over inert packing materials 32.

In the operation of the apparatus of Fig. 1 in accordance with the method of the present invention, a body of solvent is placed in reactor 2 to a level above the connection of the upper connection of conduit 6 therewith. The solvent employed is preferably carbon tetrachloride because of its relatively high solvent power for both chlorine and methane and because of its relatively low solvency for hydrogen chloride. Moreover, carbon tetrachloride is chemically inert to the reactants and reaction products and is identical with the desired end product and hence, the separation of the product of the exhaustive chlorination of methane and the solvent is not necessary, although distillation of the small amounts of the lower chlorinated derivatives of methane obtained may be desirable in order that these materials may be recycled to the reaction zone for further chlorination.

The reaction is preferably carried out under substantially anhydrous conditions, although a relatively small amount of water sometimes associated with the gaseous reactants does not inhibit the reaction. However, air or other oxygen-containing gases in the reactor have been found to inhibit the chlorination reaction and should therefore be excluded. Chlorine is admitted to the reactor 2 through chlorine inlet 8 and diffusion means 10 is rapidly dissolved. The carbon tetrachloride solution of chlorine is cooled by means of a coolant circulated in the jacket 4 in order to provide the proper temperature control within the above-prescribed temperature range, preferably within the range of about 10° C. to 20° C., in order to obtain the maximum benefits from the inverse temperature-efficiency relationship obtained by the method of the present invention and as illustrated in Fig. 2 of the drawing.

Light sources 16, 18, and 20 are turned on prior to admitting methane to the reactor 2 through methane inlet 12 and diffusion means 14. It has been found that upon introducing methane into the body of carbon tetrachloride-chlorine solution in the reaction zone, the chlorination reaction is approximately 80% complete in the region of the light source 16, i. e., substantially upon contact of the methane with the solution of chlorine. Further, it has been found that some additional effects upon the chlorination-efficiency are obtained by providing the light sources 18 and 20. Specifically, it has been found that an increase in the chlorination-efficiency of the order of 3-4% is obtained by providing the additional sources 18 and 20 during the reaction period, and this is true although the amount of chlorine fed to the reaction zone and the amount of methane introduced thereinto are within the ratios of 3:1 to 4:1. Thus, it will be observed that the preferred range of the proportions of reactants to be admitted to the reaction zone embodies a slightly greater proportion of methane than is theoretically required to obtain carbon tetrachloride. Of course, the actual ratio of the reactants in the reaction zone, i. e., at the point in which the methane is introduced into the solution of chlorine in carbon tetrachloride, which point also is preferably in the region of maximum irradiation intensity from the light sources 16, 18, and 20, since the bubbles of methane are surrounded by the body of chlorine solution and the reaction probably takes place at the gas-liquid interface as well as within the body of solution. Thus, in accordance with the method of the present invention the reactants are brought into contact with each other at a point of maximum concentration of activated chlorine atoms and at a point of maximum irradiation intensity in the reaction zone, by virtue of which the stepwise chlorine substitution reaction proceeds to a maximum degree very rapidly, at a high efficiency, and without difficulty in controlling either the reaction rate or the reaction temperature.

The body of carbon tetrachloride solution rising upwardly through the reaction zone by virtue of the gases occluded therein, principally hydrogen chloride, discharges the gases at a point above the entry of the upper arm of conduit 6 into the reactor 2, which gases are vented through gas outlet 22 to the scrubbing tower 24, wherein the hydrogen chloride or other constituent gases may be scrubbed therefrom. The body of carbon tetrachloride solution then circulates through conduit 6, returning to reactor 2 at the base thereof and below the point of entry of the chlorine from diffuser 10 at the terminus of inlet 8. The product carbon tetrachloride may be removed through conduit 34, either continuously or intermittently, by opening or closing valve 36. In this manner, the chlorination of the methane and circulation of the body of solvent in the reactor 2 may be carried on indefinitely.

In order that those skilled in the art may better understand the method of the present invention and in what manner the same may be carried into effect, the following specific examples are offered:

*Example I*

In an apparatus similar to that shown in the Fig. 1, 31.2 mols of carbon tetrachloride are charged to a reactor 2, irradiated by means of 3 200-watt incandescent lights (16, 18, 20) spaced about 10 inches apart along the reaction zone thereof. Chlorine is introduced into the reactor at the rate of 1.4 mols per hour and after initially obtaining a solution of chlorine in the body of carbon tetrachloride in the reactor, methane is introduced thereinto at the rate of 0.35 mol per hour. During the period in which the chlorination of methane is carried out, the average temperature varies within the range of 11° C. to 48° C., and the effluent gases from the reactor 2 issuing from gas outlet 22 are sampled, analyzed for chlorine, and the efficiency of the chlorination reaction determined with the following results:

| Temperature, ° C. | Chlorination Efficiency, Percent of Theoretical |
|---|---|
| 48 | 66.9 |
| 43 | 73.2 |
| 39 | 78.3 |
| 35 | 82.9 |
| 30 | 85.8 |
| 26 | 87.1 |
| 17 | 89.7 |
| 11 | 90.6 |

*Example II*

Using the same reactor and technique of operation, and the same amount of carbon tetrachloride, chlorine flow rate, and methane flow rate, the incandescent lights 16, 18, and 20 are augmented with an additional light source of the same wattage which light source is placed diametrically opposite light source 16 and adjacent reactor 2. The light sources 16, 18, and 20 are spaced as in Example I along the reaction zone. The following results are obtained:

| Lights Used | Chlorination Efficiency, Percent of Theoretical |
|---|---|
| 16 | 83.1 |
| 16 and 18 | 83.5 |
| 16, 18, and 20 | 86.9 |
| 16, 18, 20, and 16' | 86.7 |

Thus, it will be seen from the above experiment that as the reaction takes place substantially instantaneously within the region of the maximum irradiation from light source 16, and as additional lights 18 and 20 or anything in excess thereof increase the efficiency only to the extent of about 3.5% with the average temperature of the carbon tetrachloride solution maintained within the range of 25° C. to 30° C., substantial irradiation beyond the region in which the methane is introduced is unnecessary.

*Example III*

In the apparatus used in Example I, and using the same technique of operation as is there described, the same amount of carbon tetrachloride, the same flow rates of chlorine and methane are employed and the average temperature of the carbon tetrachloride solution is maintained at 28° C. ± 2° C. during the introduction of methane into the reaction zone. The chlorination efficiency attained is 81% of the theoretical based on the chlorine fed to the reactor. The yield of carbon tetrachloride is 65.2% of the amount theoretically possible from the amount of methane fed to the reactor. The amount of chloroform is about 10% of the total product produced (90% $CCl_4$), with a loss of approximately 10–15% of the methane introduced into the reactor, as determined by collecting the effluent gases from a dry ice-acetone condenser in series with scrubber 24. By decreasing the average reaction temperature to a value within the range of 10° C. to 20° C., the loss of methane is decreased by about ⅔ the amount obtained at 28° C. to 30° C., and the chlorination efficiency increases about 10%, with a corresponding increase in the amounts of chloroform and carbon tetrachloride produced.

While there have been described in detail certain forms of the invention and embodiments of its practice, the invention is not to be understood as being limited to the detailed disclosure as it is realized that changes within the scope of the invention are possible, and it is further intended that each step in the following claims shall refer to all equivalent steps for accomplishing the same result in substantially the same or equivalent manner, it being intended to cover this invention broadly in whatever form its principle may be utilized.

What is claimed is:

1. The method for the exhaustive photochemical chlorination of methane to produce carbon tetrachloride, which comprises the steps of providing a moving stream of liquid carbon tetrachloride, continuously introducing chlorine in said stream, continuously introducing gaseous methane into said stream at a point downstream of the introduction of said chlorine and where said chlorine has substantially completely dissolved, continuously irradiating said stream with light during the introduction of methane thereinto, and maintaining the temperature of said stream substantially within the range of 0° C. to 30° C.

2. The method of claim 1 in which said irradiating is of maximum intensity in the region of introduction of the gaseous methane thereinto.

3. The method of claim 1 in which the ratio of the amount of chlorine dissolved in said carbon tetrachloride to the amount of gaseous methane introduced thereinto is substantially within the range of 3:1 to 4:1.

References Cited in the file of this patent

UNITED STATES PATENTS

| Number | Name | Date |
|---|---|---|
| 2,200,254 | Bender | May 14, 1940 |
| 2,200,255 | Bender | May 14, 1940 |
| 2,473,162 | McBee et al. | June 14, 1949 |